(12) United States Patent
Yang et al.

(10) Patent No.: US 9,824,828 B2
(45) Date of Patent: Nov. 21, 2017

(54) HIGH SPECIFIC CAPACITANCE AND HIGH POWER DENSITY OF PRINTED FLEXIBLE MICRO-SUPERCAPACITORS

(71) Applicant: Singapore University of Technology and Design, Singapore (SG)

(72) Inventors: Hui Ying Yang, Singapore (SG); Ye Wang, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 46 days.

(21) Appl. No.: 14/436,534

(22) PCT Filed: Oct. 17, 2013

(86) PCT No.: PCT/SG2013/000444
§ 371 (c)(1),
(2) Date: Apr. 17, 2015

(87) PCT Pub. No.: WO2014/062133
PCT Pub. Date: Apr. 24, 2014

(65) Prior Publication Data
US 2016/0172123 A1    Jun. 16, 2016

Related U.S. Application Data

(60) Provisional application No. 61/714,820, filed on Oct. 17, 2012.

(51) Int. Cl.
| | | |
|---|---|---|
| H01G 11/00 | (2013.01) | |
| H01G 11/36 | (2013.01) | |
| H01G 11/84 | (2013.01) | |
| H01G 11/24 | (2013.01) | |
| H01G 11/38 | (2013.01) | |
| H01G 11/46 | (2013.01) | |

(Continued)

(52) U.S. Cl.
CPC ............. *H01G 11/36* (2013.01); *H01G 11/24* (2013.01); *H01G 11/38* (2013.01); *H01G 11/46* (2013.01); *H01G 11/56* (2013.01); *H01G 11/84* (2013.01); *H01G 11/86* (2013.01); *Y02E 60/13* (2013.01)

(58) Field of Classification Search
CPC ........ H01G 11/22; H01G 11/36; H01G 11/42; H01B 1/08; H01B 1/12; C01B 31/0206
USPC ......................................... 361/502; 29/25.03
See application file for complete search history.

(56) References Cited

U.S. PATENT DOCUMENTS

| | | |
|---|---|---|
| 4,722,853 A | 2/1988 | Batliwalla et al. |
| 7,061,749 B2 | 6/2006 | Liu et al. |

(Continued)

FOREIGN PATENT DOCUMENTS

| | | | |
|---|---|---|---|
| CN | 102176378 A | | 9/2011 |
| KR | 20060040990 A | * | 5/2006 |
| WO | WO 2014/062133 A1 | | 4/2014 |

OTHER PUBLICATIONS

Lei et al., Ultrathin MnO2 nanofibers grown on graphitic carbon spheres as high-peformance asymmetric supercapacitor electrodes, Oct. 4, 2011, J. Mater.Chem, 2012, 22,153-160.*

(Continued)

*Primary Examiner* — Eric Thomas
(74) *Attorney, Agent, or Firm* — Hamilton, Brook, Smith & Reynolds, P.C.

(57) ABSTRACT

The invention relates to micro supercapacitors and nanocomposite active materials and methods of fabrication thereof.

6 Claims, 7 Drawing Sheets

(51) Int. Cl.
H01G 11/56 (2013.01)
H01G 11/86 (2013.01)

(56) References Cited

U.S. PATENT DOCUMENTS

| | | | | |
|---|---|---|---|---|
| 2012/0236467 A1* | 9/2012 | Kang | ............... | B82Y 10/00 361/502 |
| 2013/0244121 A1* | 9/2013 | Gogotsi | ............... | H01M 4/583 429/338 |
| 2014/0029161 A1* | 1/2014 | Beidaghi | ............... | H01G 11/24 361/502 |

OTHER PUBLICATIONS

International Search Report for Int'l Application No. PCT/SG2013/000444, titled: High Specific Capacitance and High Power Density of Printed Flexible Micro-Supercapacitors, dated Mar. 14, 2014.
Written Opinion for Int'l Application No. PCT/SG2013/000444, titled: High Specific Capacitance and High Power Density of Printed Flexible Micro-Supercapacitors, dated Mar. 14, 2014.
International Preliminary Report on Patentability for Int'l Application No. PCT/SG2013/000444, titled: High Specific Capacitance and High Power Density of Printed Flexible Micro-Supercapacitors, dated Apr. 21, 2015.
Beidaghi, Majid et al,"Micro-Supercapacitors Based on Interdigital Electrodes of Reduced Graphene Oxide and Carbon Nanotube Composites with Ultrahigh Power Handling Performance," *Adv. Funct. Mater.*, 22: 4501-4510 (2012).
Cao, Liujun et al., "Direct Laser-Patterned Micro-Supercapacitors from Paintable $MoS_2$ Films," *Small*, 7: 2905-2910 (2013).
Chen, Po-Chiang et al., "Flexible and transparent supercapacitor based on $In_2O_3$ nanowire/carbon nanotube heterogeneous films," *Applied Physics Letters*, 94: 3 pages (2009).
Chmiola, John et al., "Monolithic Carbide-Derived Carbon Films for Micro-Supercapacitors," *Science*, 328: 480-483 (2010).
El-Kady, Maher F. et al., "Laser Scribing of High-Performance and Flexible Graphene-Based Electrochemical Capacitors," *Science*, 335: 1326 (2012).
El-Kady, Maher F. et al., "Scalable fabrication of high-power graphene micro-supercapacitors for flexible and on-chip energy storage," *Nature Communications*, 4: 1 (2013).
Gao, Wei et al., "Direct laser writing of micro-supercapacitors on hydrated graphite oxide films," *Nature Nanotechnology*, 6: 496 (Aug. 2011).
Hsia, Ben et al., "Photoresist-derived porous carbon for on-chip micro-supercapacitors," *Carbon*, 57: 395-400 (2013).
Huang, Peihua et al., "Micro-supercapacitors from carbide derived carbon (CDC) films on silicon chips," *Journal of Power Sources*, 225: 240-244 (2013).
In, Hyun Jin et al., "Origami fabrication of nanostructured, three-dimensional devices: Electrochemical capacitors with carbon electrodes," *Appl. Phys. Lett.*, 88: 3 pages (2006).
Ji, Hengxing et al., "Swiss roll nanomembranes with controlled proton diffusion as redox micro-supercapcitors," *Chem. Commun.*, 46: 3881-3883 (2010).

Jiang, Y.Q. et al., "Planar Mems Supercapacitor Using Carbon Nanotube Forests," *IEEE 22nd International Conference on Micro Electro Mechanical Systems*: 587-590 (2009).
Kötz, R. et al., "Principles and applications of electrochemical capacitors," *Electrochimica Acta*, 45: 2483-2498 (2000).
Liu, Chang et al., "Advanced Materials for Energy Storage," *Advanced Energy Materials*, 22: E28-E62 (2010).
Liu, Chi-Chie et al., Electrochemical micro-capacitors of patterned electrodes loaded with manganese oxide and carbon nanotubes, *Journal of Power Sources*, 196(13): 5761-5768 (Jul. 1, 2011).
Liu, Wen-Wen et al., *"Superior Micro-Supercapacitors Based on Graphene Quantum Dots," Adv. Funct. Mater.*, 23: 4111-4122 (2013).
Makino, Sho et al., "Synthesis of electro-deposited ordered mesoporous $RuO_x$ using lyotropic liquid crystal and application toward micro-supercapacitors," *Journal of Power Sources*, 227: 153-160 (2013).
Pech, David et al., "Elaboration of a microstructured inkjet-printed carbon electrochemical capacitor," *Journal of Power Sources*, 195(4): 1266-1269 (2010).
Shen, Caiwei et al., "A high-energy-density micro supercapacitor of asymmetric $MnO_2$-carbon configuration by using micro-fabrication technologies," *Journal of Power Sources*, 234: 302-309 (2013).
Sun, Wei et al., "Preparation and characterization of polypyrrole films for three-dimensional micro supercapacitor," *Journal of Power Sources*, 193: 924-929 (2009).
Sun, Wei et al., "Symmetric redox supercapacitor based on microfabrication with three-dimensional polypyrrole electrodes," *Journal of Power Sources*, 195(20): 7120-7125 (2010).
Wang, Guoping et al., "A review of electrode materials for electrochemical supercapacitors," *Chem. Soc., Rev.*, 41: 797-828 (2012).
Wang, Kai et al., "An All-Solid-State Flexible Micro-supercapacitor on a Chip," *Advanced Energy Materials*, 1(6): 1068-1072 (Nov. 2011).
Wang, Xu et al., "Manganese oxide micro-supercapacitors with ultra-high areal capacitance," *The Nanoscale*, 5: 4119-4122 (2013).
Wen, Chun-ming, "Preparation and Electrochemical Characteristics of Three-dimensional Manganese Oxide Micro-supercapacitor Electrode," *Chin. J. Chem. Phys.*, 25: 209 (2012).
Xia, Hui et al., "Nanoflaky $MnO_2$/carbon nanotube nanocomposites as anode materials for lithium-ion batteries," *Journal of Materials Chemistry*, 20: 6896-6902 (2010).
Xue, Mianqi et al., "Microfluidic etching for fabrication of flexible and all-solid-state micro supercapacitor based on $MnO_2$ nanoparticles," *Nanoscale*, 3: 2703-2708 (2011).
Zhang, Yanping, "Carbon nanotube-zinc oxide electrode and gel polymer electrolyte for electrochemical supercapacitors," *Journal of Alloys and Compounds*, 480: L17-L19 (2009).
Zhao, Mu et al., "Large-scale synthesis of onion-like carbon nanoparticles by carbonization of phenolic resin," *Acta Materialia*, 55: 6144-6150 (2007).
Zhi, Mingjia et al., "Nanostructured carbon-metal oxide composite electrodes for supercapacitors: a review," *Nanoscale*, 5: 72-88 (2013).

* cited by examiner

Step 1     Step 2     Step 3     Step 4

HIGH SPECIFIC CAPACITANCE AND HIGH POWER DENSITY OF PRINTED FLEXIBLE MICRO-SUPERCAPACITORS

This application is the U.S. National Stage of International Application No. PCT/SG2013/000444, filed Oct. 17, 2013, which designates the U.S., published in English, and claims the benefit of U.S. Provisional Application No. 61/714,820, filed Oct. 17, 2012. The entire teachings of the above applications are incorporated herein by reference.

BACKGROUND OF THE INVENTION

Global demand for energy has increased rapidly due to the tremendous industrial development and fast growth of population [1]. As one of the most important energy storage devices, supercapacitors have recently attracted intensive research interests and innovation strategies [2, 3]. As compared to batteries, supercapacitors show advantageous features such as higher power density and faster charge-discharge rate [4]; however, the low energy density stored in the devices and difficulties in using them in a flexible and reliable way severely hampers their wider usage in a variety of applications.

Recent advances in nanoscience and nanotechnology have suggested that microsupercapacitors (MSCs), with electrode, channel and current collector, and having a size in the range of micrometers, possess one of the most promising designs for energy storage. Compared to conventional batteries and supercapacitors, research in the area of flexible supercapacitors or MSCs is just at its infancy. Depending on the active materials used, fabrication of MSCs may require different techniques, which need to be fully understood in terms of the device design, consolidation and testing procedures. For example, the laser writing (or scribing) method has been successfully demonstrated as a method suitable for the synthesis of graphene or graphene oxide MSCs [5, 6]. However, this same method is not amendable for the fabrication of metal oxides (a group of pseudo-supercapacitor active materials) MSCs. Except direct laser writing/scribing [5-8], multiple technologies have been designed and developed for special MSCs fabrication, such as multilayer nanomembranes rolled-up [9], origami [10], conventional microelectronic-fabrication process [10-21], electrochemical deposition [22, 23], ink-jet printing [24], electrostatic spray deposition [25], and deep etching [26]. Moreover, most strategies involve various chemical treatments, complicated fabrication processes, and high costs, making them difficulty applied for commercialization or mass production. As such, most of the research efforts have concentrated on the particular active material and a general route to integrate various active materials into MSCs by same technology likewise is rarely reported in literatures.

SUMMARY OF THE INVENTION

In a first aspect, the present invention relates to a micro supercapacitor, comprising a substrate, a first metal electrode, a second metal electrode, an active material coating the first metal electrode and the second metal electrode, comprising manganese oxide ($MnO_2$), carbon nanostructures and optionally a binder, and an electrolyte. The first metal electrode and the second metal electrode can be located in the same plane on the substrate. The electrolyte can comprise a solid electrolyte.

The active material can also comprise a carbon nanostructure and/or a metal oxide. The carbon nanostructure can comprise onion like carbon, carbon nanotubes, conductive carbon black, or a combination thereof. In one embodiment, the active material comprises manganese oxide ($MnO_2$) deposited on the surface of onion-like carbon. In one embodiment, the active material comprises manganese oxide ($MnO_2$) and carbon nanotubes. In yet another embodiment, the active material comprises manganese oxide ($MnO_2$) and graphene.

The substrate can be comprise polyethylene terephthalate (PET), polyethylene naphthalate (PEN), polycarbonate (PC), polyethersulfone (PES), photographic paper, insulated thermal tape, or a combination thereof. The substrate can also be flexible.

The metal electrode can comprise a metal selected from silver (Ag), gold (Au), copper (Cu), aluminum (Al), platinum (Pt), or a combination or alloys thereof. The first metal electrode and the second metal electrode can be patterned. For example, the first metal electrode and the second metal electrode can be patterned to create channels of varying widths between the first metal electrode and the second metal electrode. In one embodiment, the channel width between the first metal electrode and the second metal electrode is less than about 1 mm.

The binder can comprise a polymer or copolymer comprising vinylidene fluoride, trifluoroethylene, chlorotrifluoroethylene, tetrafluoroethylene, hexafluoropropylene, 1,1-chlorofluoroethylene, poly(methyl methacrylate), 11-aminoundecanoic acid, thiourea, or a combination thereof.

In another aspect, the present invention relates to a method of making a micro supercapacitor, comprising: a) screen printing a metal ink on a substrate to form a first metal electrode and a second metal electrode; b) drying the first metal electrode and the second metal electrode under vacuum and elevated temperature; c) screen printing an active material ink on top of the first metal electrode and the second metal electrode to form an active material on the first and second metal electrode; d) drying the active material on the first and second metal electrode at an elevated temperature; and e) drop-casting a solid electrolyte onto the active material on the first and second metal electrode to form the micro supercapacitor.

The present invention also relates to ari active material, comprising manganese oxide ($MnO_2$) grown on the surface of onion-like carbon. The manganese oxide ($MnO_2$) grown on the surface of onion-like carbon can form a nanocomposite having a diameter between about 50 nm and about 400 nm. In one embodiment, the nanocomposite exhibits a flower-like structure composed of manganese oxide ($MnO_2$) nanoribbons radiating from the onion-like carbon center of the nanocomposite.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7(b) is a plot of the potential in volts at various current densities ($\mu A/cm^2$) over time (charge/discharge curves) of a solid flexible $MnO_2$/OLC-MSC. FIG. 7(c) is a plot of the specific capacitance in $mF/cm^2$ over a range of current densities ($\mu A/cm^2$) of a solid flexible $MnO_2$/OLC-MSC. FIG. 7(d) is a plot of the cyclic voltammetry (CV) at various scan rates (e.g., 5 mV/s to about 50 mV/s) of a $MnO_2$/OLC-MSC.

DETAILED DESCRIPTION OF THE INVENTION

Figure 1A:
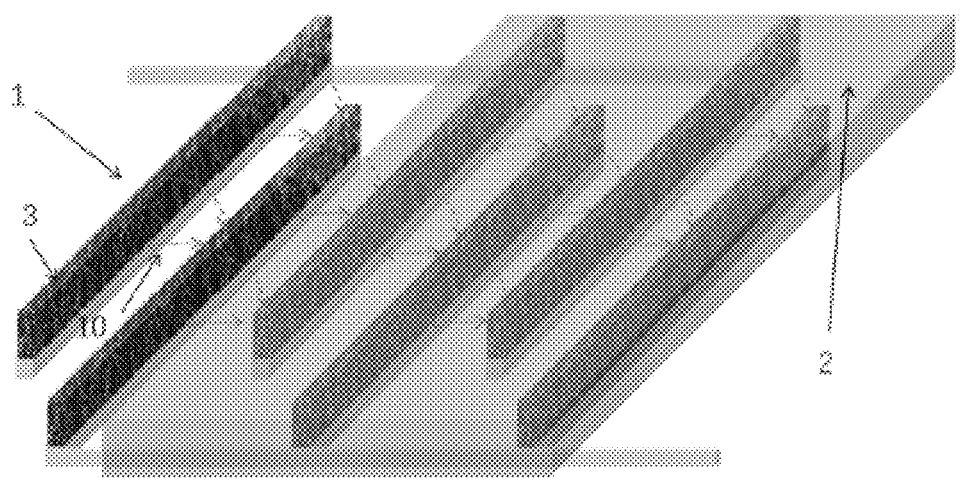
FIG. 1(a) is a schematic illustration of a carbon nanotube micro supercapacitor (CNT-MSC).

The present invention relates to printable micro supercapacitors (MSCs), with carbon nanostructures and carbon nanostructure/metal oxide nanocomposites employed as the active materials. Micro supercapacitor may help solve several major existing challenges in supercapacitor operation. The high surface-to-volume ratios in the active materials of the present invention together with micrometer diffusion channels can provide flexible MSCs with not only high volumetric capacity [11], but also with high power densities and high energy densities [5, 7, 27]. MSCs of the present invention have high charge-discharge rates due to the shortened diffusion length (as shown in FIG. 1(a)) [11]. The flexible MSCs of the present invention can be used to drive circuit on chip micro-electromechanical systems (MEMS), or can be integrated with next generation flexible electrical and electronic devices to power wearable circuits [5].

In one aspect, the present invention relates to a micro supercapacitor, comprising a substrate, a first metal electrode, a second metal electrode, an active material coating the first metal electrode and the second metal electrode, and an electrolyte. The active material can comprise manganese oxide ($MnO_2$) and/or a carbon nanostructure and optionally can further comprise a binder. The first metal electrode and the second metal electrode coat the substrate and are located in the same plane on the substrate.

The substrate can be rigid or flexible and transparent or opaque. For example, the substrate can be glass, quartz, boron nitride, silicon with silicon dioxide ($SiO_2$) on top, plastics, polyethylene terephthalate (PET), polyethylene naphthalate (PEN), polycarbonate (PC), polyethersulfone (PES), photographic paper, insulated thermal tape, or a combination thereof. The identity of the substrate is determined by the particular application for which the MSC is being used.

The metal electrodes or current collectors (1 in FIG. 1) can comprise one or more metals or a metal alloy. The metal of the metal electrode should be a conductor that is compatible with the temperature for deposition of carbon nanostructure (e.g. between about 50° C. to about 250° C.). The metal electrode is formed through the printing of the metal ink onto the substrate using screen printing technology followed by drying of the resulting metal electrode (e.g., in an oven). Examples of metals that may be used in fabricate the metal electrode include, but are not limited to, silver (Ag), gold (Au), copper (Cu), aluminum (Al), platinum (Pt), or combinations or alloys thereof. The first metal electrode and the second metal electrode can be the same or different. For example, the first and second electrodes can be a silver (Ag) electrode or the first electrode can be a silver (Ag) electrode and the second electrode can be a gold (Au) electrode.

Figure 1B:
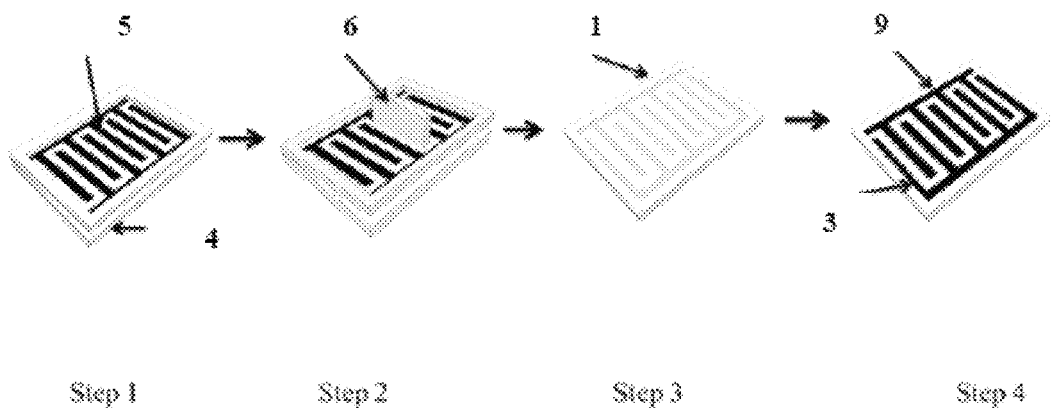
FIG. 1(b) is a schematic illustration of the carbon nanotube micro supercapacitor (CNT-MSC) fabrication process using the screen printing technology.
Figure 2:
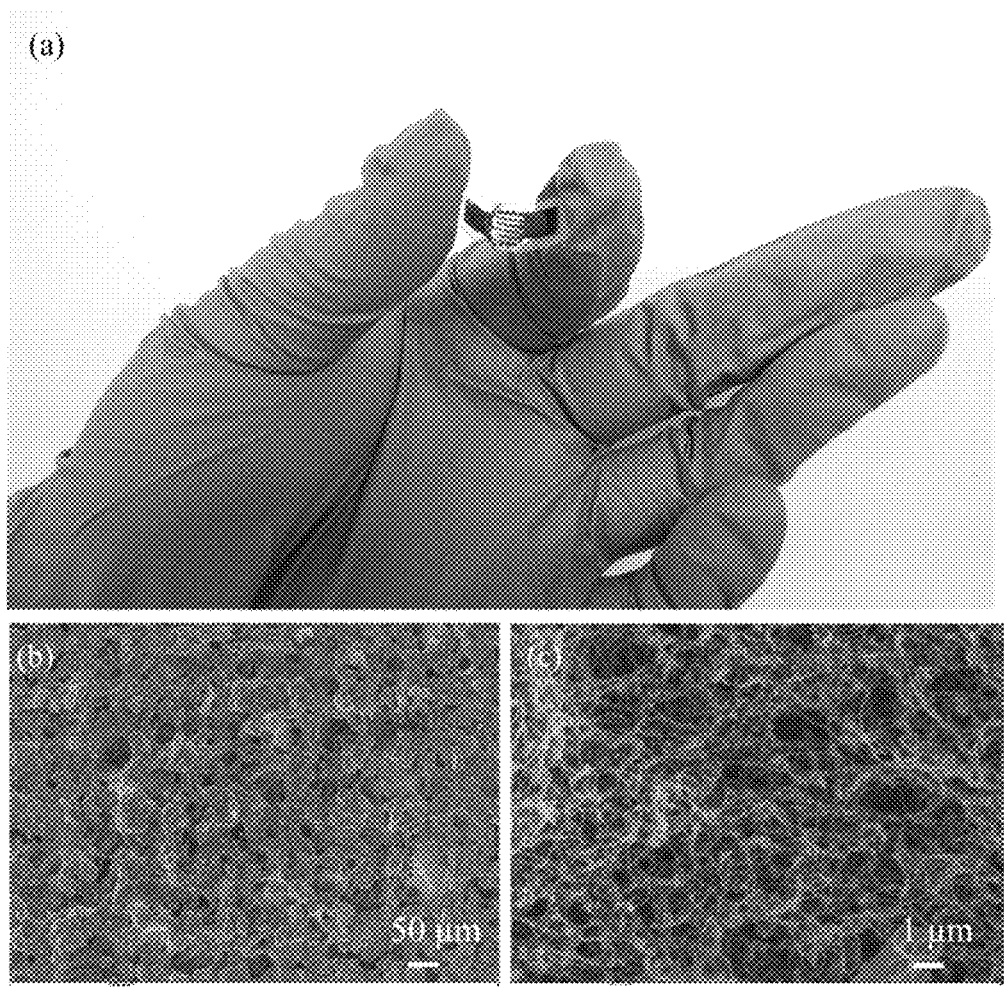
FIG. 2(a) is a picture of a flexible carbon nanotube micro supercapacitor (CNT-MSC).
FIGS. 2(b) and 2(c) are scanning electron microscope (SEM) images of a carbon nanotube (CNT) active material printed on a silver (Ag) electrode.

In one embodiment, the metal electrode can be patterned. The first metal electrode and the second metal electrode can be patterned on the substrate to create a pattern with channels between the first metal electrode and the second metal electrode (FIG. 1). For example, the first and second electrodes can be patterned into an interdigital shape as depicted in FIGS. 1(b) and 2(a). The pattern is not limited to an interdigital shape and may include other patterns. The channel between the first and second electrodes can have a width less than about 1 mm, preferably less than about 0.3 mm, more preferably less about 0.1 mm.

The printed metal electrode should to be dried at an elevated temperature. The drying temperature for the metal electrode should be lower than the melting or carbonization point of the substrate used, but higher than the curing temperature of the metal ink. The drying temperature of metal ink can vary depending on the identity of the substrate and can be in the range of about 120° C. to about 250° C. In one embodiment, the drying temperature is between about 150° C. to about 240° C. In another embodiment, the drying temperature is between about 180° C. to about 220° C. For example, the drying temperature of Ag ink printed onto a PET substrate can be in the range of about 180° C. to about 220° C.

The active material can comprise a carbon nanostructure, a metal oxide, or a combination thereof. As defined herein, the term "active material" is a material capable of storing a charge (e.g., electrical) inside or on the surface of the material. The active material can also comprise a combination of one or more carbon nanostructures and one or more metal oxides. In one embodiment, the active material comprises a carbon nanostructure and a metal oxide. In another embodiment, the active material comprises carbon nanotubes and manganese oxide ($MnO_2$). In yet another embodiment, the active material comprises onion-like carbon and manganese oxide ($MnO_2$). In another embodiment, the active material comprises graphene and manganese oxide ($MnO_2$).

The metal oxide of the present invention is not limited to manganese oxide ($MnO_2$). Other metal oxides of the invention include, but are not limited to, manganese oxide ($MnO_2$), ruthenium oxide ($RuO_2$), nickel oxide (NiO), cobalt oxide (e.g., CoO, $Co_2O_3$, $Co_3O_4$), copper oxide (CuO), vanadium oxide (e.g., $V_2O_5$, $V_2O_3$, $VO_2$, VO), iron-manganese oxide (e.g., $Fe_2O_3$, $Fe_3O_4$) iron-manganese oxide, iron-nickel oxide, iron-copper oxide, cobalt-manganese oxide, manganese-titanium oxide, or a combination thereof. In one embodiment, the metal oxide is $MnO_2$. The metal oxide of the invention should have the ability to transport electrons and to support high capacitance and high power density.

"Carbon nanostructure," as the term is used herein, is defined as any carbon form with at least one dimension on the order of 1 μm or less. Examples of carbon nanostructures include, but are not limited to, onion-like carbon, carbon nanotubes (e.g., carbon single-wall nanotubes, multi-wall nanotubes), nanohorns, nanowires, nanofoam, nanoribbon, buckytubes, carbon fibers, activated carbon (including extruded activated carbon), conductive carbon black, oriented pyrolytic graphite; carbon aerogels; and various forms of graphene.

The carbon nanostructure in the present invention describes the material, and is not restricted by the methods used to prepare the material. Carbon nanostructures can be directly grown on a metal substrate using thermal chemical deposition, microwave plasma chemical deposition, arc-discharge, or laser vaporization synthesis, for example. The synthesis conditions (e.g., temperature, pressure, carrier gas, etc.), metal catalyst type (for carbon nucleation), and carbon source (e.g., graphite or hydrocarbon) are all known to influence the properties of the resulting carbon nanostructures. Various carbon sources can also be utilized to grow carbon nanotubes. Examples of carbon sources that may be used to grow carbon nanotubes include, but are not limited to, alkanes, alkenes, alkylenes, alkynes, polymers, carbon oxides, and combinations thereof. Additional carbon sources for growing carbon nanotubes are envisioned.

Carbon nanotubes are generally categorized as single-wall carbon nanotubes (SWNT) and multi-wall carbon nanotubes (MWNT). Single-wall carbon nanotubes are fullerenes consisting essentially of $sp^2$-hybridized carbon typically arranged in hexagons and pentagons. These carbon cylindrical structures, known also as "buckytubes," have extraordinary properties, including high electrical, thermal conductivity, high strength and stiffness. Multi-wall carbon nanotubes are nested single-wall carbon cylinders and possess some properties similar to single-wall carbon nanotubes.

Single-wall carbon nanotubes and multi-wall carbon nanotubes can be made by any known means, such as by gas-phase synthesis from high temperature, high-pressure carbon monoxide, catalytic vapor deposition using carbon-containing feedstocks and metal catalyst particles, laser ablation, an arc-discharge method, or any other method for synthesizing single-wall and multi-wall carbon nanotubes.

Onion-like carbon is referred to by various names (e.g., carbon onion, bucky onion, onion-like fullerene, and onion-like graphite) and is a kind of giant fullerene. It has a structure in which around the perimeter of the core, at the central portion comprising $C_{60}$ or the like, it has fullerenes each having a still larger molecular weight concentrically stacked one on another. Onion-like carbon can be made by any known method. For example, carbonization of phenolic-formaldehyde resin at 1000° C. with the aid of ferric nitrate, or alternatively, pyrolysis of carbon black at 1000° C. can provide onion-like carbon.

The active material can further comprise a binder. The active material is mixed with the binder to form a slurry that can then be screen printed or applied to the metal electrodes. As used herein, a "binder" refers to a material that can be used to bind components of a mixture together. The binder can be a polymer or a copolymer. As used herein, the term "polymer" refers to a macromolecule made of repeating monomer units. The term "copolymer" is defined as a polymer of at least two chemically distinct monomers. The copolymers of the invention include, but are not limited to, alternating copolymers, statistical copolymers, block copolymers, random copolymer, and, graft copolymers. In one embodiment, the binder is a polymer comprising at least one monomer. In another embodiment, the binder is a copolymer comprising one or more monomers.

In one embodiment, the binder is a polymer or a copolymer. The monomers that can be used to synthesize the binder polymers or copolymers of the present invention include, but are not limited to, vinylidene fluoride, trifluoroethylene, chlorotrifluoroethylene, tetrafluoroethylene, hexafluoropropylene, 1,1-chlorofluoroethylene, poly(methyl methacrylate), 11-aminoundecanoic acid, and thiourea, or a combination thereof. The binder polymers of the present invention can be a copolymer comprising two or more monomers.

The ratio of one monomer to another monomer or monomers used to synthesize the copolymers can vary depending on the properties desired. The ratio of one monomer to another monomer can be between about 60:40 to about 95:5. In one embodiment, the binder is polyvinyl difluoride (PVDF). In another embodiment, the binder is poly(vinylidene fluoride-co-trifluoroethylene) (P(VDF-TrFE)). The binder can also be a blend of two or more polymers or copolymers. The binder can be present in an amount of about 40 wt % to about 5 wt % of the active material mixture, preferably about 20 wt %, more preferably about 10 wt %.

The electrolyte can be solid or liquid, although solid electrolytes are preferred. When the electrolyte is a solid, it may be chemically bonded or physically adsorbed with the metal oxide and/or the carbon nanostructures, or it may form a distinct phase within the structure. Various solid electrolytes are suitable for use in the MSC of the present invention. Examples of solid electrolytes include, but are not limited to, polyvinyl alcohol (PVA)/phosphoric acid ($H_3PO_4$), PVA/sulfuric acid ($H_2SO_4$), PVA/potassium hydroxide (KOH), PVA/sodium hydroxide (NaOH), or a combination thereof. In one embodiment, the solid electrolyte is polyvinyl alcohol (PVA)/phosphoric acid ($H_3PO_4$)

Liquid electrolytes in micro supercapacitors may be aqueous or organic. Examples of aqueous liquid electrolytes include, but are not limited to, sodium sulfate, potassium sulfate, sulfuric acid, potassium hydroxide, and sodium hydroxide. Examples of organic electrolytes include, but are not limited to, tetraalkylammonium salts, ethylene carbonate, propylene carbonate, propanediol-1,2-carbonate, dichloroethylene carbonate, polyurethane, lithium trifluoromethanesulfonate ($LiCF_3SO_3$), polyurethane-lithium perchlorate, poly(acrylonitrile)-lithium salts, and poly (acrylonitrile)-quaternary ammonium salts.

The present invention also relates to a method of making a micro supercapacitor, comprising: a) screen printing a metal ink on a substrate to form a first metal electrode and a second metal electrode; b) drying the first metal electrode and the second metal electrode under vacuum and elevated temperature; c) screen printing an active material ink on top of the first metal electrode and the second metal electrode to form an active material on the first and second metal electrode; d) drying the active material on the first and second metal electrode at an elevated temperature; and e) drop-casting a solid electrolyte onto the active material on the first and second metal electrode to form the micro supercapacitor. The method is suitable for making CNT-MSCs as well as MSCs containing other active materials such as carbon nanostructures, metal oxides, carbon/metal-oxides, and combinations thereof.

A schematic diagram of the all solid micro supercapacitor (e.g., CNT-MSC) is shown in FIG. 1(a). The basic structure of the MSC is composed of two electrodes 1 (positive and negative electrodes), active material 3 on top of the electrodes and the electrolyte 2. In order to increase the electrode area, the electrodes are patterned into an interdigital shape. The ions 10 transfer the charges between the two electrodes to run the charge/discharge process indicated by the arrows in FIG. 1(a).

A schematic diagram of the micro supercapacitor (e.g., CNT-MSC) fabrication process is shown in FIG. 1(b). The metal (e.g., Ag) electrodes 1 can be screen printed directly on the bare substrate 4 (e.g., PET) as show in FIG. 1. Screen printing of the metal electrode uses a mesh screen to receive or produce a desired image or pattern. The openings in the mesh screen allow the transferring of ink or other printable materials which can then be pressed through the mesh as a sharp-edged image onto a substrate. The screen is attached to a support (e.g., a substrate) and the pattern is formed on the screen. A brush is used to push the ink through the openings of the mesh screen onto the substrate. After printing, the screen/mesh is removed. The mesh screen 5 can be made of various materials and the openings of the mesh screen can also vary in size.

During the printing process, a mesh screen 5 possessing a pattern is placed on top of the substrate 4 (step 1, FIG. 1(b)) and the ink (e.g., Ag ink) is pressed through the openings of the mesh screen 5 using a brush 6 (step 2, FIG. 1(b)). The screen 5 is then removed to provide the patterned electrode (e.g., interdigital pattern, metal pattern) on the substrate 4. Once the metal electrodes are dried, the active material ink can be screen printed (3 in FIG. 1) onto the electrodes and dried to form a CNT metal electrode using the same printing process used for making the metal electrodes 1 (step 4, FIG. 1(b)) to produce the MSC circuit 9. An active material ink can be prepared, for example, by mixing 80 wt % CNT, 10 wt % conductive carbon black and 10 wt % polyvinyldifluoride (PVDF) binder in N-methylpyrrolidone (NMP) using an agate mortar (see FIG. 1).

The micro supercapacitor can be tested in either a solid or liquid electrolyte. When the MSC is tested in a solid electrolyte, an electrolyte 2 can be drop-cast onto the dried active material on the first and second metal electrodes (e.g., $MnO_2$/OLC-Ag electrode) and then allowed to solidify overnight to form the solid electrolyte and complete the fabrication of the all solid micro supercapacitor.

The drying of the first and second electrode and the active material can be done at a temperature between about 100° C. to about 250° C. for between about 1 h to about 48 h. The drying of the first and second electrode and the active material can also be done under both reduced pressure (e.g., vacuum) and at elevated temperatures. The optimal conditions for the drying of the metal electrode and the drying of the active material will depend on the identity of the metal and active material being used to fabricate the MSC. For example, an Ag electrode can be dried under vacuum (e.g., in a vacuum oven) at temperature of about 200° C. for about 2 h. A manganese oxide/onion-like ($MnO_2$/OLC) active material can be dried at a temperature of about 110° C. for about 10 h. The drying conditions may also vary between active materials made by different fabrication processes.

The electrochemical properties of solution based MSCs were studied using a typical three-electrode configuration in 6 M aqueous KOH at room temperature. A saturated calomel electrode (SCE) was selected as the reference electrode. For solid MSCs, the electrochemical properties were investigated at room temperature using a typical two electrode configuration with polyvinyl alcohol/phosphoric acid (PVA/$H_3PO_4$) as the solid electrolyte.

FIG. 2(a) is a photograph of a carbon nanotubes micro supercapacitor (CNT-MSC) held by a researcher showing the flexible properties of the MSCs. FIGS. 2(b) and (c) show the scanning electron microscope (SEM) images of carbon nanotubes (CNT) on a silver (Ag) electrode or current collector. The Ag electrodes and the CNTs can be patterned to form a network shape as depicted in FIG. 2(c) which facilitates the complete immersion of the electrolyte into the CNT-MSC resulting in higher energy storage.

Figure 3:
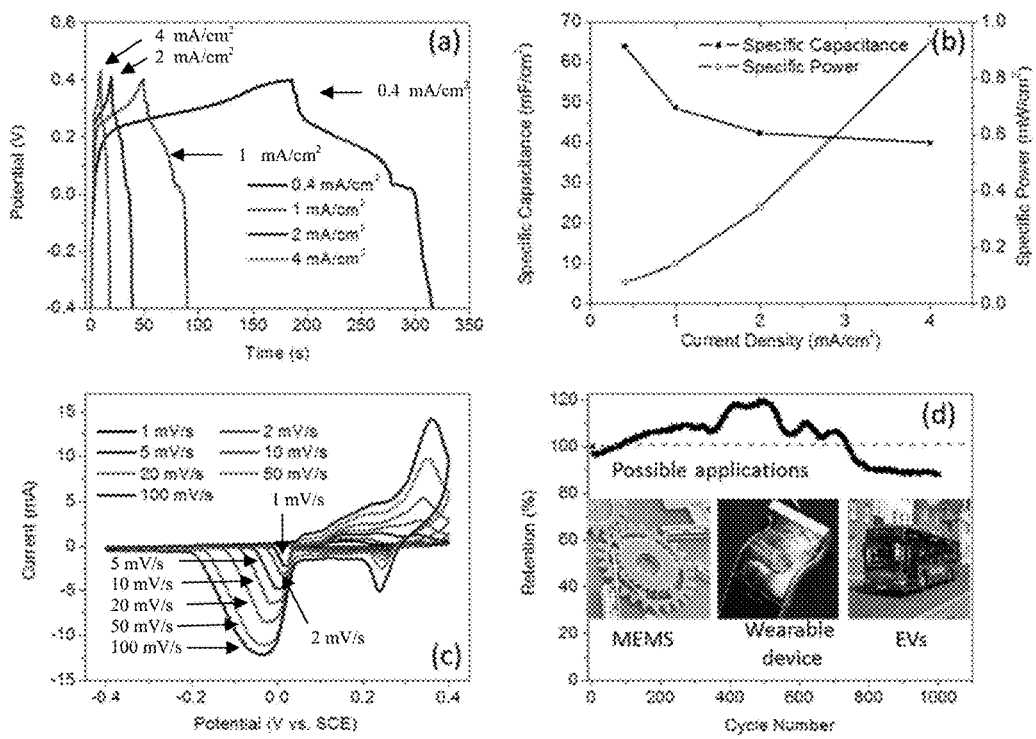
FIG. 3(a) is a plot of the potential in volts at various current densities over time in seconds (charge/discharge curves) of a screen printed carbon nanotube micro supercapacitor (CNT-MSC) measured in liquid electrolyte where a saturated calomel electrode (SCE) is used as the reference electrode.
FIG. 3(b) is a plot of the specific capacitance in $mF/cm^2$ and specific power values in $mW/cm^2$ at various current densities ($mA/cm^2$).
FIG. 3(c) is a plot of cyclic voltammetry (CV) at various scan rates (e.g., about 1 mV/s to about 100 mV/s).
FIG. 3(d) is a plot of the capacity retention of CNT-MSC at a current density of 0.4 $mA/cm^2$ over several cycles. The insert in FIG. 3(d) depict possible applications for CNT-MSCs.

The electrochemical characteristics of a carbon nanotubes micro supercapacitor (CNT-MSC) were performed in KOH electrolyte and included charging/discharging curves under different current densities and CV tests at varied scan rates. The results are shown in FIG. 3. The Ag electrode can act as the current collector and the CNT can act as the active material. The specific capacitance and power of a CNT-MSC can reach up to about 40 $mF/cm^2$ and about 0.928 $mW/cm^2$, respectively, at a current density of about 4 $mA/cm^2$. The capacity for a CNT-MSC can also be maintained at about 87.5% after about 1000 time cycles. The specific capacitance of a CNT-MSC was shown to be much higher than that of CNT forest MSCs and activated carbon MSCs [17, 24]. These results confirm that screen printed MSCs can store and release energy. The flexible electronic MSC devices of the present invention provide energy storage devices allow energy storage without a heavy or bulky MSC structure.

The solid MSCs as compared to the solution based MSCs (e.g., containing liquid electrolytes) can be bent into any shape without electrolyte leakage. From the point of fabrication, solid flexible MSCs can be easier and cheaper than the solution-based MSCs to prepare but both solid and solution-based MSCs are accessible and provide energy storage.

Figure 4:
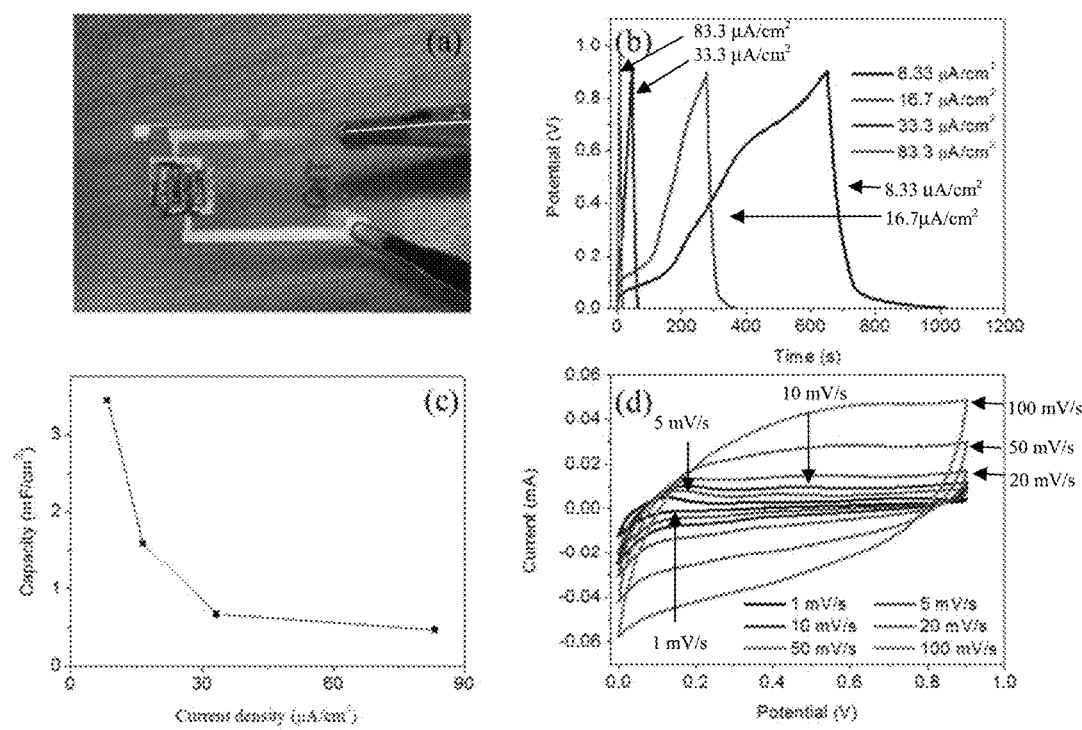
FIG. 4(a) is a photograph of a solid flexible carbon nanotube micro supercapacitor (CNT-MSC) with a channel size of 1000 p.m.
FIG. 4(b) is a plot of the potential in volts at various current densities ($\mu A/cm^2$) over time of a solid flexible CNT-MSC.
FIG. 4(c) is a plot of the capacity in $mF/cm^2$ over a range of current densities ($\mu A/cm^2$) of a solid flexible CNT-MSC.
FIG. 4(d) is a plot of the current in mA at various scan rates over a range of potentials (about 1 mV/s to about 100 mV/s) of a solid flexible CNT-MSC.

FIG. 4(a) shows a photograph of a solid flexible CNT-MSC. The electrochemical characterizations in FIGS. 4(b) to 4(c) show that the capacitance of a solid flexible CNT-MSC can reach up to about 3.5 $mF/cm^2$ at a current density of about 83 $\mu A/cm^2$. The performance of the solid flexible CNT-MSCs can be further improved by optimizing the fabrication parameters or employing other active materials.

In another aspect, the present invention also relates to an active material, comprising manganese oxide ($MnO_2$) grown on the surface of onion-like carbon (OLC) to form a $MnO_2$/OLC nanocomposite. The manganese oxide ($MnO_2$) grown on the surface of onion-like carbon forms a nanocomposite. The nanocomposite exhibits a flower-like structure composed of manganese oxide ($MnO_2$) nanoribbons radiating from the onion-like carbon center of the nanocomposite. The $MnO_2$ can be made by various methods. For example, one method that can be used to make the $MnO_2$/OLC nanocomposite is the hydrothermal method described in Example 2.

The onion-like carbon can be synthesized by various methods and can have a diameter between about 5 nm and about 80 nm, preferably between about 10 nm and about 60 nm, more preferably between about 15 nm and about 40 nm. Once the manganese oxide ($MnO_2$) is deposited on the surface of onion-like carbon the resulting nanocomposite can have a diameter between about 50 nm and about 400 nm, preferably between about 100 nm and about 300 nm, more preferably between about 200 nm and about 300 nm.

The interplanar spacing and length of $MnO_2$ nanoribbons can vary. The interplanar spacing of the $MnO_2$ nanoribbons is determined by the precursor and synthesis method used. In one embodiment, the interplanar spacing of the $MnO_2$ nanoribbons is between about 0.67 nm to about 0.72 nm. The length of $MnO_2$ nanoribbons can be anywhere between about 10 nm to about 300 nm, preferably about between about 20 nm to about 250 nm, more preferably between about 30 nm to about 200 nm, most preferably between about 100 nm and about 150 nm. In one embodiment, the length of $MnO_2$ nanoribbons is about 120 nm for $MnO_2$/OLC nanocomposite.

Figure 5:
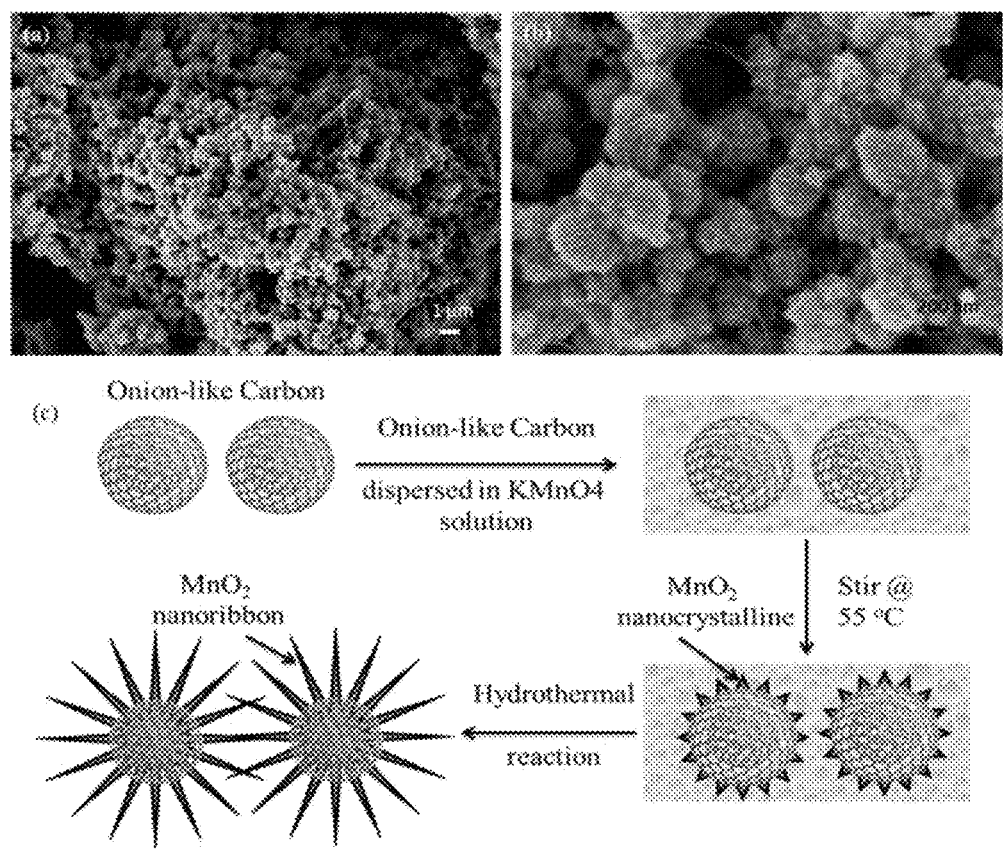
FIG. 5(a) and FIG. 5(b) are field emission scanning electron micrographs (FESEM) of a manganese oxide/onion-like carbon ($MnO_2$/OLC) nanocomposite active material morphology at two different magnifications and scale bars (1 $\mu m$ and 200 nm).
FIG. 5(c) is a schematic diagram of the proposed growth mechanism of the oxide/onion-like carbon ($MnO_2$/OLC) nanocomposite synthesized by hydrothermal method.

The morphologies of $MnO_2$/OLC nanocomposite are shown in FIG. 5(a) and FIG. 5(b) at scale bars of 1 μm and 200 nm, respectively. The diameter of the pure OLC of $MnO_2$/OLC shown in FIG. 5 was determined to be between about 20 nm to about 30 nm, while the diameter of $MnO_2$/OLC nanocomposite in FIG. 5 was found to be in the range of about 200 nm to about 300 nm. The $MnO_2$/OLC nanocomposite exhibit a flower like structure composed of $MnO_2$ nanoribbons radiating from the centre. The morphology of the nanocomposite were found to be similar to that of nanoflakes grown from CNT [28]. A proposed growth mechanism is shown in FIG. 5(c).

The OLC was fully immersed in a $KMnO_4$ solution at low temperature (about 45° C. to about 55° C.) and the solution was then heated by a hydrothermal process to produce the final $MnO_2$/OLC nanocomposite. When the solution was heated, $MnO_2$ nanocrystals/seeds grew on the surface of the OLC. This growth is believed to have occurred due to the slow reaction between $KMnO_4$, the onion-like carbon and water as depicted in equation 1 (eqn 1). The $MnO_2$ nanoribbons are believed to have grown from the nanocrystals/seeds on the surface of the OLC as the mixture was heated [28].

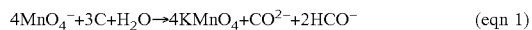

$$4MnO_4^- + 3C + H_2O \rightarrow 4KMnO_4 + CO^{2-} + 2HCO^- \quad (eqn\ 1)$$

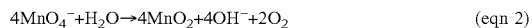

$$4MnO_4^- + H_2O \rightarrow 4MnO_2 + 4OH^- + 2O_2 \quad (eqn\ 2)$$

Figure 6:
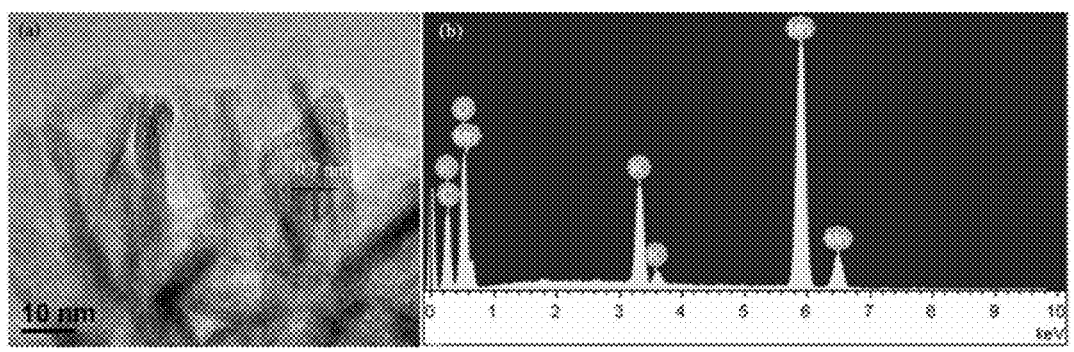
FIG. 6(a) is a transmission electron micrograph of the nanoribbons formed upon the growth of manganese oxide ($MnO_2$) on the surface of the onion-like carbon (OLC).
FIG. 6(b) is an energy dispersive X-ray (EDX) spectrum of the manganese oxide/onion-like carbon ($MnO_2$/OLC) active material (nanocomposite).

It is known that $KMnO_4$ decomposes in water (eqn. 2). It is believed that this decomposition is what can lead to the flower-like shape of the $MnO_2$ observed on the surface of OLC. The TEM image of the nanoribbons shown in FIG. 6(a) revealed that the interplanar spacing of $MnO_4$ nanoribbons is about 0.7 nm. The length of $MnO_2$ nanoribbons was estimated to be about 100 nm for $MnO_2$/OLC nanocomposite. The nanocomposite product obtained appeared to possess a birnessite-type $MnO_2$, which has interlayer water and potassium doping. The EDX spectroscopy results shown in FIG. 6(b) indicated that the K/Mn ratio is about 0.23.

Figure 7:
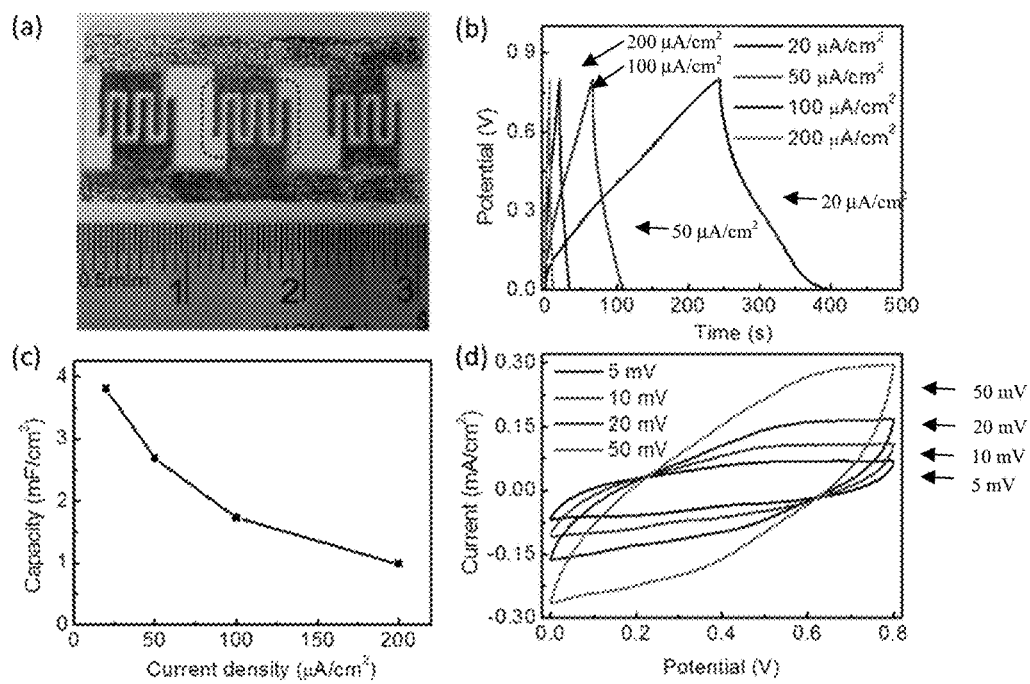
FIG. 7(a) is a photograph of solid flexible manganese oxide/onion-like carbon micro supercapacitors ($MnO_2$/OLC-MSCs) with the channel width of 600 $\mu m$.
FIG. 7(b) to FIG. 7(d) is the electrochemical characterization of the solid flexible $MnO_2$/OLC-MSC.

FIG. 7(a) show photographs of solid flexible $MnO_2$/OLC-MSCs. The electrochemical characterizations of one solid flexible $MnO_2$/OLC-MSC in FIG. 7(a) are shown in FIGS. 7(b) to 7(d). The capacitance of the $MnO_2$/OLC-MSCs in FIG. 7(a) can reach up to about 3.8 mF/cm² under a current density of about 0.02 mA/cm². The device performance can be further improved by optimizing the fabrication conditions, employing other active materials, and the varying the MSC dimensions.

EXAMPLES

Example 1

Preparation of Onion-like Carbon

Ethanol, Ferric nitrate (FN) and phenolic formaldehyde resin (PF) (in a molar ratio of 1:16 FN:PF) were placed in a flask and the resulting mixture was stirred until a homogeneous solution was formed. The solvent was then removed under vacuum to obtain a solid [29]. Hexamethylenetetramine (14 wt %) and acetone were added to the resulting solid and the resulting mixture was subjected to ultrasonic vibration for 20 minutes. The mixture was then heated in an oven at about 60° C. to remove the acetone, and then the temperature was increased to about 150° C. to produce a cross-linked structure. Carbonization of the resulting cross-linked structure was accomplished by heating the cross-linked structure to about 1000° C. for about 10 h under an atmosphere of nitrogen to obtain the carbon/iron composite. The iron was removed by treating the carbon/iron composite with 37 wt % hydrochloric acid (HCl) for about 48 hours to obtain the desired product. The resulting product was washed with distilled water until the pH of the filtrate was approximately 7 or neutral.

Example 2

Preparation of Manganese Oxide ($MnO_2$)/Onion-like Carbon Nanocomposite 150 mg of potassium permanganate ($KMnO_4$) was dissolved in 25 ml deionized (DI) water. 50 mg of onion-like carbon (OLC) was then added and the resulting mixture was stirred at about 55° C. for about 6 hours. The mixture was transferred to a 50 ml Teflon-lined stainless steel autoclave, sealed and heated in an oven at about 150° C. for 12 hours. After 12 hours, the resulting mixture was cooled to room temperature and the desired product was isolated as a solid by centrifugation. The product was then washed several times with deionized water and dried at 100° C. overnight.

Morphologies of the nanocomposites were examined by field emission scanning electron microscopy (FESEM) and transmission electron microscopy (TEM). Compositional investigation of nanocomposites was carried out with energy-dispersive X-ray (EDX).

Example 3

Preparation of the Manganese Oxide/Onion-like Carbon Active Material Ink 80 wt % $MnO_2$/OLC, 10 wt % conductive carbon black and 10 wt % polyvinyldifluoride (PVDF) binder in N-Methylpyrrolidone (NMP) were placed in an agate mortar and mixed until a slurry was formed. The slurry can then be used as the active material ink in the fabrication of the micro supercapacitor.

Example 4

Preparation of the Electrolyte Solution 3 g of polyvinyl alcohol (PVA), 3 g phosphoric acid ($H_3PO_4$) and 30 ml deionized water (DI) water were placed in a flask and heated to about 85° C. for 2 hours to form a clear solution. The resulting solution was used to form the solid electrolyte.

Example 5

Preparation of the Micro Supercapacitor

Silver (Ag) electrodes (current collector) were screen printed directly on a polyethylene terephthalate (PET) substrate using silver metal ink and dried in a vacuum for 2 hours at temperature of about 200° C. The manganese oxide/onion-like active material ink was then screen printed onto the Ag electrode and dried in a vacuum oven at about 110° C. for 10 h. Once dried, the electrolyte solution was drop-cast onto manganese oxide/onion-like Ag electrode and then allowed to solidify overnight to form the solid electrolyte and complete the fabrication of the micro supercapacitor.

Example 6

Electrochemical Characterization of the MSCs

The MSCs were characterized to determine their capacitance, voltage window, and other parameters.

The galvanostatic charge/discharge test was performed using a voltage range of 0 to 1 volt and at varying current densities of about 0.02 milliampere per square centimeter (mA cm$^{-1}$) to 0.2 mA cm$^{-1}$ on a Newware battery tester (Shenzhen, China). The values of specific capacitance reported herein were measured using cyclic Voltammetry (CV). CV was carried out using an electrochemical workstation VMP3, manufactured by Bio-Logic, France. CV measurements were carried out at different scan rates. The electrochemical characterization results for the CNT-MSC can be found in FIG. 3, for the solid flexible CNT-MSC can be found in FIG. 4, and for the solid flexible MnO$_2$/OLC-MSC can be found in FIG. 7.

REFERENCES

1. Liu C, Li F, Ma L P, Cheng H M 2010 *Adv. Mater.* 22 E28.
2. Kotz R, Carlen M 2000 *Electrochim. Acta* 45 2483-98.
3. Zhi M, Xiang C, Li J, Li M, Wu N 2013 *Nanoscale* 5 72-88.
4. Wang G P, Zhang L, Zhang J J 2012 *Chem. Soc. Rev.* 41 797-828.
5. El-Kady M F, Strong V, Dubin S, Kaner R B 2012 *Science* 335 1326-30.
6. Gao W, Singh N, Song L, Liu Z, Reddy A L M, Ci L J, Vajtai R, Zhang Q, Wei B Q, Ajayan P M 2011 *Nat. Nanotechnol.* 6 496-500.
7. El-Kady M F, Kaner R B 2013 *Nat. Commun.* 4 1475-83.
8. Cao L, Yang S, Gao W, Liu Z, Gong Y, Ma L, Shi G, Lei S, Zhang Y, Zhang S 2013 *Small* 9 2905-10.
9. Ji H X, Mei Y F, Schmidt O G 2010 *Chem. Commun.* 46 3881-3.
10. In H J, Kumar S, Shao-Horn Y, Barbastathis G 2006 *Appl. Phys. Lett.* 88 083104.
11. Wang K, Zou W J, Quan B G, Yu A F, Wu H P, Jiang P, Wei Z X 2011 *Adv. Energy Mater.* 1 1068-72.
12. Chen P C, Shen G, Sukcharoenchoke S, Zhou C 2009 *Appl. Phys. Lett.* 94 043113.
13. Wen C M, Wen Z Y, You Z, Wang X F 2012 *Chinese J. Chem. Phys.* 25 209-13.
14. Liu C C, Tsai D S, Chung W H, Li K W, Lee K Y, Huang Y S 2011 *J. Power Sources* 196 5761-8.
15. Sun W, Chen X Y 2009 *J. Power Sources* 193 924-9.
16. Sun W, Zheng R L, Chen X Y 2010 *J. Power Sources* 195 7120-5.
17. Jiang Y Q, Zhou Q, Lin L. Planar MEMS Supercapacitor using Carbon Nanotube Forests. In: MEMS 2009. IEEE 22nd International Conference on, 2009, pp. 587-90.
18. Huang P, Heon M, Pech D, Brunet M, Taberna P-L, Gogotsi Y, Lofland S, Hettinger J D, Simon P 2013 *J. Power Sources* 225 240-4.
19. Wang X, Myers B D, Yan J, Shekhawat G, Dravid V, Lee P S 2013 *Nanoscale* 5 4119-22.
20. Hsia B, Kim M S, Vincent M, Carraro C, Maboudian R 2013 *Carbon* 57 395-400.
21. Shen C, Wang X, Li S, Wang J, Zhang W, Kang F 2013 *J. Power Sources* 234 302-9.
22. Liu W W, Feng Y Q, Yan X B, Chen J T, Xue Q J 2013 *Adv. Funct. Mater.* 23 4111-22.
23. Makino S, Yamauchi Y, Sugimoto W 2013 *J. Power Sources* 227 153-60.
24. Pech D, Brunet M, Taberna P L, Simon P, Fabre N, Mesnilgrente F, Conedera V, Durou H 2010 *J. Power Sources* 195 1266-9.
25. Beidaghi M, Wang C 2012 *Adv. Funct. Mater.* 22 4501-10.
26. Xue M Q, Xie Z, Zhang L S, Ma X L, Wu X L, Guo Y G, Song W G, Li Z B, Cao T B 2011 *Nanoscale* 3 2703-8.
27. Chmiola J, Largeot C, Taberna P L, Simon P, Gogotsi Y 2010 *Science* 328 480-3.
28. Xia H, Lai M O, Lu L 2010 *J. Mater. Chem.* 20 6896-902
29. Zhao M, Song H H, Chen X H, Lian W T 2007 *Acta Mater.* 55 6144-50.

The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of making a micro supercapacitor, comprising
    a) screen printing a metal ink on a substrate to form a first metal electrode and a second metal electrode;
    b) drying the first metal electrode and the second metal electrode under vacuum and elevated temperature;

c) screen printing an active material ink on top of the first metal electrode and the second metal electrode to form an active material on the first and second metal electrode;
d) drying the active material on the first and second metal electrode at an elevated temperature; and
e) drop-casting a solid electrolyte onto the active material on the first and second metal electrode to form the micro supercapacitor.

2. The method of claim 1, wherein the active material comprises a carbon nanostructure, a metal oxide, or combination thereof.

3. The method of claim 1, wherein the active material comprises manganese oxide ($MnO_2$) and carbon nanotubes.

4. The method of claim 1, wherein the active material comprises manganese oxide ($MnO_2$) and onion like carbon.

5. The method of claim 1, wherein the active material comprises manganese oxide ($MnO_2$) and graphene.

6. The method of claim 1, wherein the first metal electrode and the second metal electrode are patterned to create channels between the first metal electrode and the second metal electrode.

* * * * *